United States Patent Office 3,616,706
Patented Nov. 2, 1971

3,616,706
TRANSMISSION DEVICE OF A SHEAVE DRIVE TYPE
Susumu Shimamoto, Hamamatsu-shi, Japan, assignor to Yamaha Hatsudoki Kabushiki Kaisha, Hamakita-shi, Shizuoka-ken, Japan
Filed May 15, 1969, Ser. No. 824,922
Claims priority, application Japan, May 18, 1968, 43/40,724
Int. Cl. F16h 55/52
U.S. Cl. 74—230.17                        7 Claims

ABSTRACT OF THE DISCLOSURE

This transmission device is characterized by having a hollow cylinder which is rotatably secured to the driven shaft, though immovable in the axial direction. To the hollow cylinder is secured a driven sheave pulley consisting of a pair of first and second conically shaped disks, said first disk being fixed to said hollow cylinder and said second disk being splined to said driven sleeve movably in its axial direction within a specified range, though immovably in its rotating direction. Torques are applied only through said second disk from said pulley to the driven shaft, and vice versa.

BACKGROUND OF THE INVENTION

This invention relates to a transmission device of a torque-sensitive sheave drive type and more particularly to a transmission device of a sheave drive type mainly used in an endless-belt traction snow vehicle or other types of vehicles, for example, an automobile.

It has been well known that a driven sheave of such transmission device comprises a pair of first and second conically shaped disks, said first disk being fixed to a driven shaft thereof and said second disk being splined to said driven shaft in a manner to be slightly movable in the axial and rotating directions; and a pair of transmission members provided with pairs of helically inclined planes engaged with each other, one of which is fixed to said second conically shaped disk, the other of which is fixed to said driven shaft; whereby the distance between said first and second disks decreases as the torque applied to said driven shaft increases and vice versa.

However, the second disk of said prior art driven sheave can not rotate in cooperation with the first disk during the variation of the torque, but is only operable in response to said variation, because the first disk is fixed to the driven shaft and the second disk is rotatable around said driven shaft. Consequently, the unavoidably different rotations of said disks cause the endless transmission belt to slip at the side surfaces contacting said disks, so that said driven sheave can not transmit all torques to be utilized. Moreover, the variation of the load is transmitted to the endless transmission belt only by the medium of said second disk, so that said driven sheave can not respond sensitively to said variation, but only partly thereto.

SUMMARY OF THE INVENTION

An object of the invention is to provide a transmission device of a sheave drive type wherein a driven sheave makes a very sensitive response to the variation of torques and can transmit all torques effectively.

Therefore, the transmission device of this invention in which there are provided a driving shaft, a driven shaft, a driving sheave secured to said driving shaft, a driven sheave secured to said driven shaft, and an endless transmission belt stretched over the driving and driven sheaves, is characterized in that said driven sheave comprises a driven sleeve rotatably secured to said driven shaft, though immovable in an axial direction; a pair of first and second conically shaped members, said first conically shaped member being fixed to said driven sleeve and said second conically shaped member being splined to said driven sleeve movably in its axial direction within a specified range, though immovably in its rotating direction; a pair of transmission members engaged with each other in the rotating direction of said driven shaft and relatively movable in the axial direction of said driven shaft due to their interface inclining with respect to said axial direction, one of said transmission members being fixed to said driven shaft and the other transmission member being involved in said second conically shaped member; and means for urging said second conically shaped member to the first one, said endless transmission belt being interposed between both conically shaped members.

DESCRIPTION OF THE PREFERRED EMBODIMENTS

Figure 1:
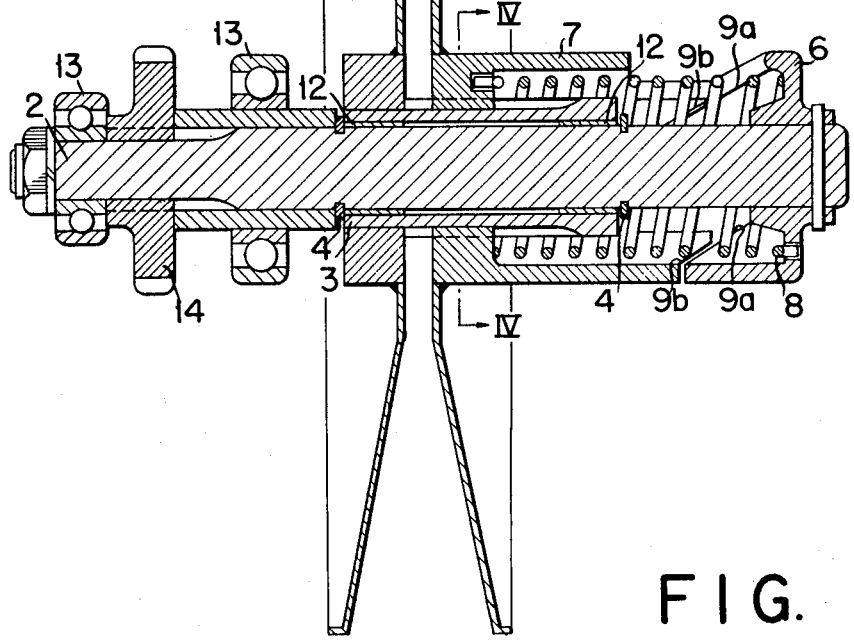
FIG. 1 is a cross sectional view of a driven sheave and a corresponding driven shaft in a transmission device embodying this invention.
Figure 4:
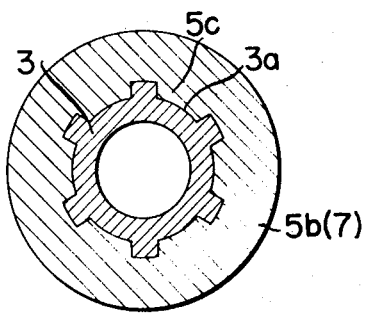
FIG. 4 is a cross sectional view of the other transmission member taken along a line IV—IV of FIG. 1.

A transmission device of a sheave drive type embodying this invention comprises a driving sheave secured to a driving shaft (not shown because of a general type), a driven sheave, which is the essential part of this invention, secured to a driven shaft 2 and an endless transmission belt 1 stretched over the driving and driven sheaves (the latter sheave is detailed hereinafter and indicated by a reference numeral 5) of said device.

As illustrated, said driven sheave 5 comprises a hollow cylinder or a driven sleeve 3 rotatably secured to a driven shaft 2, though immovable in an axial direction by means of stop rings 4 fixedly secured to said driven shaft 2; and first and second conically shaped members or disks 5a and 5b. Said first conically shaped disk 5a is fixed to said driven sleeve 3 and said second conically shaped disk 5b is splined to said driven sleeve 3 for rotation therewith, but is movable axially within a specified range, though immovably in its rotating direction, said first and second conically shaped disk 5a and 5b are in opposed relationship defining wedging, gripping surfaces for said transmission belt.

Said driven sheave 5 further comprises first and second pairs of transmission members including a hub portion 6 and 7 engaged with each other in the rotating direction of said driven shaft 2 and relatively movable in an axial direction thereof due to their interface inclining with respect to the axial direction thereof; and means or a spring 8 for urging said second conically shaped member 5b toward the first one 5a. Said transmission member 6 is fixed to said driven shaft 2 and the other transmission member 7 is affixed to said second conically shaped member 5b. Said transmission member 7 preferably consists of a hollow cylindrical hub portion integrally formed with the body of said second conically shaped disk 5b. The above-mentioned endless belt 1 is interposed between both conically shaped disk 5a and 5b.

The inclined interface is defined by two mutually facing first and second helically inclined planes 9a and 9b formed on mutually facing ends of said transmission members 6 and 7 respectively. Each of said inclined planes 9a and 9b is divided into a plurality of angular spaced apart sections, for example, three sections 10a, 10b and 10c arranged along and inclined with respect to a circular line defined on a plane perpendicular to the axis of the driven shaft 2. In this embodiment, said transmission members 6 and 7 are formed into hollow cylindrical hub portions respectively, one of the opposite ends of each block being blinded and the other being open. On the peripheral edge of each open end of the transmission members 6 and 7 are formed equally annularly spaced apart sawteeth separating said sections 10a, 10b and 10c. Said transmission members are engaged with each other with their sections 10a, 10b and 10c coupled to the corresponding sections. In each section of the transmission member 6 may be embedded a slide piece 11 of frictionless material such as polyamide resin.

The urging means 8 consists of a helical torsion and compression spring member urging said inclined planes 9a and 9b to be pressed to each other. Said spring member 8 is disposed in the hollow portions of said transmission members in a manner to lie between the inner walls of their blinded ends with the ends of said spring member secured thereto respectively.

The driven sleeve 3 has splines 3a formed on the outer peripheral surface thereof and the second conically shaped disk 5b, more particularly a part of the transmission member 7 has axial protrusions 5c with which said splines slidably fit in.

In this embodiment, between the driven sleeve 3 and driven shaft 2 are interposed metal bushings 12. Said driven shaft 2 is rotatably supported by ball bearings 13 which are mounted on the frame (not shown). Positioned between said bearings 13 is a sprocket wheel 14 fixed to said driven shaft 2.

In operation, when the torque or load applied to the driven shaft 2 is increased, there positively occurs slipping between the inclined planes 9a and 9b of the transmission members 6 and 7 due to the increase of the thrust component of the torque. Consequently, the distance between the first and second conically shaped members 5a and 5b is reduced so as to increase the effective operable diameter of said members 5a and 5b, along which the endless transmission belt 1 turns, whereby the conically shaped members 5a and 5b are reduced in speed and increased in torque. Said slipping continues until the thrust component of the load, with the aid of said compressive resistance of the spring member 8, is offset by the opposite side thrust applied to the member 5b from the endless transmission belt 1.

When the torque applied to the driven shaft 2 is reduced, there negatively occurs slipping between the inclined planes 9a and 9b due to the reduction of the thrust component of the torque. Consequently, the distance between the first and second conically shaped members 5a and 5b is increased so as to reduce the effective operable diameter of said members 5a and 5b, whereby the conically shaped members 5a and 5b are increased in speed and decreased in torque. Said slipping continues until the opposite side thrust is offset by the thrust component of the load with the aid of said compressive resistance of the spring member 8, since the compressive resistance is increased due to the reduced distance between the ends of said compressive spring member 8, even if the load is reduced. In this case, the torsional motion of the spring member 8 is utilized to prevent the inclined planes from being disengaged from each other.

In this embodiment, it is very important that the first and second conically shaped members 5a and 5b are secured to each other, immovably in its rotating direction and movably in its axial direction, by the medium of the driven sleeve 3, and that the driving torque delivered to the first and second conically shaped members 5a and 5b from the endless transmission belt 1 is transmitted by means of two inclined planes 9a and 9b formed on the transmission members 6 and 7 fixed to the driven shaft 2 and the second conically shaped member 5b respectively. Consequently, said driven sheave makes a very sensitive response to the variation of torques and can transmit all of them effectively.

Figure 5:
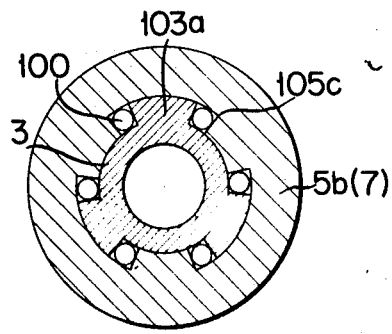
FIG. 5 is a cross sectional view of the transmission member modified from that shown in FIGS. 1 and 4.
Figure 2:
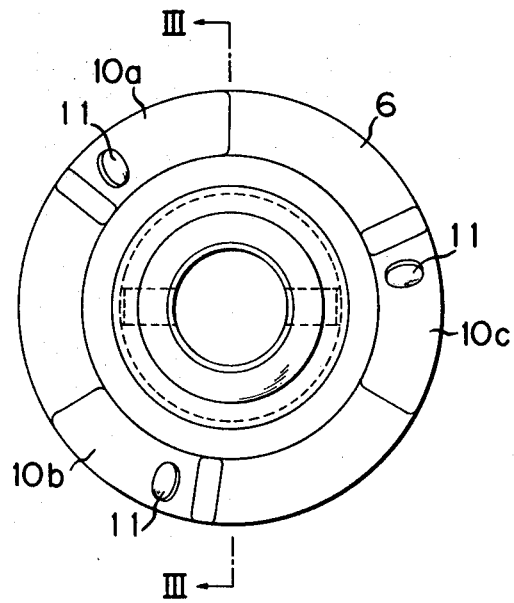
FIG. 2 is an end view of one of the transmission members in said output sheave drive means.
Figure 3:
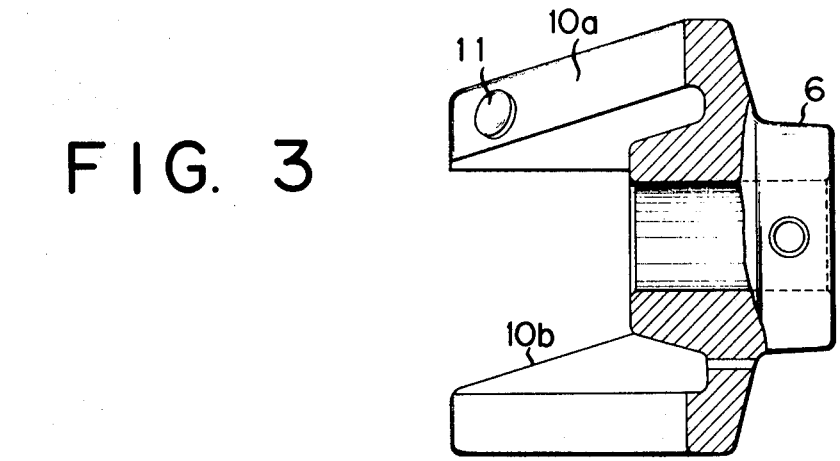
FIG. 3 is a cross sectional view of said transmission member taken along a line III—III of FIG. 2.

In the arrangement, the splines 3a and axially extending protrusion 5c may be replaced by axially extending protrusion 5c may be replaced by axially extending protrusions 103a integrally formed with the peripheral surface of said driven sleeve 3, and axially extending grooves 105c formed on the inner surface of said second conically shaped disk 5b which is a part of the transmission member 7 as shown in FIG. 5. Said protrusions 103a slidably fit in with said grooves 105c respectively. Between the radial walls of said grooves 105c and protrusions 103a are interposed a plurality of balls 100.

The splines 3a and protrusion 5c may also be replaced by axially extending grooves 203a and 205c formed on the outer and inner peripheries of said driven sleeve 3 and second conically shaped member respectively, each of said grooves of the driven sleeve 3 facing each of the corresponding grooves of the second conically shaped member, and there are interposed a plurality of balls 200 between the paired grooves. Such a condition is indicated in FIG. 6.

Figure 6:
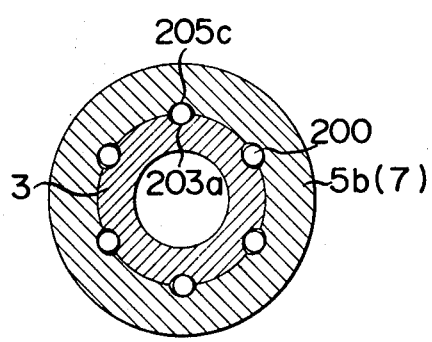
FIG. 6 is a cross sectional view of the transmission member further modified from that shown in FIGS. 1 and 4.

The mechanisms shown in FIGS. 5 and 6 are effective to reduce the friction loss caused by the axial sliding of the driven sleeve 3 and second conically shaped member.

What is claimed is:

1. In a power transmission device,
    a rotatable driven shaft,
    a driven sleeve coaxial with and rotatable on said driven shaft,
    a first sheave member having a conical face portion and affixed onto and coaxial with said sleeve to rotate therewith,
    a second sheave member having a conical face portion and a hub portion coaxially received on said sleeve and splined thereto for movement axially of said sleeve, said first and second sheave members having their conical face portions in opposed relationship defining wedging gripping surfaces for a driving belt, said hub portion having an end portion remote from said second sheave member,
    first angularly spaced apart toothed abutment members on the end of said hub portion,
    a hub member affixed onto said driven shaft coaxially thereof,
    second angularly spaced apart abutment members on said hub member to engage respectively with said first angularly spaced apart abutment members on said hub portion, and
    a helical torsion spring surrounding said driven shaft and connecting said hub portion and said hub member together to effect rotation of said driven shaft by said sheave members and also to effect axial movement of said second sheave axially relative to said first sheave.

2. In a power transmission device, as defined by claim 1, the addition of offset portions on the abutment faces of the abutments of said hub member to engage the opposed surfaces of the abutment members on said hub portion.

3. A power transmission device comprising: a rotatable driven shaft; a driven sleeve disposed coaxially with and rotatable on said driven shaft; a first conically shaped disk affixed on and disposed coaxial with said sleeve to rotate therewith; and a second conically shaped disk having a hub portion coaxially received on said sleeve and splined thereto for axial movement on said sleeve; said first and second conically shaped disks being in opposed relationship defining wedging gripping surfaces for a transmission belt; said hub portion having an end portion remote from said second conically shaped disk;

a first helically inclined plane, on the end of a first transmission member fixed to said driven shaft, divided into a plurality of angularly spaced sections; a second transmission member fixed to said end portion of said hub portion; a second helically inclined plane, on the end of said second transmission member, divided into a plurality of angularly spaced apart sections which engage the corresponding angularly spaced apart sections of said first helically inclined plane in combination with said first helically inclined plane transmitting the most part of the torque from said drive sleeve to said driven shaft; and a helical compression spring surrounding said driven shaft between said first and second transmission members and urging said second conically shaped disk toward said first conically shaped disk.

4. In a power transmission device, as defined by claim 3, the addition of said helical torsion spring secured to said first and second members so as to exert a torsional force on said first and second helically inclined planes for their firm engagement.

5. In a power transmission device, as defined by claim 3, the addition of a slide piece on each of said first helically inclined plane to engage said second helically inclined plane.

6. In a power transmission device, as defined by claim 3, said driven sleeve having at least one axial protrusion formed on the peripheral surface thereof, and second conically shaped disk having at least one axial groove into which said protrusion is fitted and a plurality of balls interposed between the radial walls of said groove and protrusion.

7. In a power transmission device, as defined by claim 3, said driven sleeve and second conically shaped disk having a plurality of grooves respectively, each of said grooves of the driven sleeve facing each of the corresponding grooves of the second conically shaped disk, and a plurality of balls interposed between the paired grooves.

References Cited

UNITED STATES PATENTS

| | | | |
|---|---|---|---|
| 2,287,326 | 6/1942 | Reeves | 74—230.17 |
| 2,711,103 | 6/1955 | Miner | 74—230.17 |
| 2,812,666 | 11/1957 | Huck | 74—230.17 |
| 2,900,834 | 8/1959 | Bessette | 74—230.17 |
| 2,905,005 | 9/1959 | Miner | 74—230.17 |
| 2,952,161 | 9/1960 | Williams | 74—230.17 |
| 3,195,364 | 7/1965 | Pauli | 74—230.17 |

FOREIGN PATENTS

| | | | |
|---|---|---|---|
| 672,599 | 5/1952 | Great Britain | 74—230.17 |
| 785,130 | 10/1957 | Great Britain | 74—230.17 |

CORNELIUS J. HUSAR, Primary Examiner